US009689977B2

(12) United States Patent
Van Fleet et al.

(10) Patent No.: US 9,689,977 B2
(45) Date of Patent: Jun. 27, 2017

(54) SYSTEM AND METHOD TO MONITOR POWERLINES

(71) Applicant: MASTINC., New York, NY (US)

(72) Inventors: Steve Van Fleet, Lagrangeville, NY (US); Brian Von Herzen, Minden, NV (US)

(73) Assignee: MASTINC, New York, NY (US)

( * ) Notice: Subject to any disclaimer, the term of this patent is extended or adjusted under 35 U.S.C. 154(b) by 0 days.

(21) Appl. No.: 14/020,518

(22) Filed: Sep. 6, 2013

(65) Prior Publication Data

US 2014/0064389 A1 Mar. 6, 2014

Related U.S. Application Data

(60) Provisional application No. 61/697,583, filed on Sep. 6, 2012.

(51) Int. Cl.

| | |
|---|---|
| *G08C 19/12* | (2006.01) |
| *G01S 13/08* | (2006.01) |
| *H04B 3/54* | (2006.01) |
| *G01S 13/10* | (2006.01) |
| *G01S 13/86* | (2006.01) |
| *G01S 13/88* | (2006.01) |
| *H02G 7/00* | (2006.01) |
| *H02G 7/20* | (2006.01) |
| *G01S 15/02* | (2006.01) |
| *G01S 13/26* | (2006.01) |
| *G01S 15/10* | (2006.01) |
| *G01S 15/88* | (2006.01) |

(52) U.S. Cl.
CPC .............. *G01S 13/08* (2013.01); *G01S 13/10* (2013.01); *G01S 13/86* (2013.01); *G01S 13/88* (2013.01); *H02G 7/00* (2013.01); *H02G 7/20* (2013.01); *H04B 3/54* (2013.01); *G01S 13/26* (2013.01); *G01S 15/025* (2013.01); *G01S 15/10* (2013.01); *G01S 15/88* (2013.01)

(58) Field of Classification Search
CPC .......... G01S 13/08; G01S 13/26; G01S 13/86; G01S 13/88; H04B 3/54
See application file for complete search history.

(56) References Cited

U.S. PATENT DOCUMENTS

| | | | |
|---|---|---|---|
| 5,890,068 A | * | 3/1999 | Fattouche et al. .......... 455/456.2 |
| 5,984,810 A | * | 11/1999 | Frye et al. .................... 473/455 |
| 6,253,424 B1 | | 7/2001 | Rainville-Lonn |
| 6,523,424 B1 | * | 2/2003 | Hayes et al. ............. 73/862.391 |
| 7,430,932 B2 | * | 10/2008 | Mekhanoshin et al. ..... 73/865.9 |

(Continued)

OTHER PUBLICATIONS

The International Search Report issued in International Patent Application No. PCT/US2013/056552 on Feb. 18. 2014.

*Primary Examiner* — Omeed Alizada
(74) *Attorney, Agent, or Firm* — Seyfarth Shaw LLP

(57) ABSTRACT

The invention encompasses a system and method for monitoring a power line. In certain embodiments, a system emits a series of signals that allow for analytic analysis of a power line. For example, by taking multiple signal readings, it is possible to detect an average height reading of a power line and observe long-term trends in the time delay from signal emission to reception of an echo-signal. This allows for accurate measurement of various physical parameters of a power line, for example, the height of the power line above the ground.

21 Claims, 4 Drawing Sheets

(56) References Cited

U.S. PATENT DOCUMENTS

| | | |
|---|---|---|
| 8,150,421 B2 | 4/2012 | Ward et al. |
| 2005/0077902 A1* | 4/2005 | MacGregor .............. G01V 3/12 324/334 |
| 2005/0096065 A1* | 5/2005 | Fleischman ....... H04L 29/12028 455/456.1 |
| 2012/0190386 A1 | 7/2012 | Anderson |

* cited by examiner

SYSTEM AND METHOD TO MONITOR POWERLINES

FIELD OF THE INVENTION

The invention encompasses a system and method for monitoring a power line. In certain embodiments, a system emits a series of signals that allow for analytic analysis of a power line. For example, by taking multiple signal readings, it is possible to detect an average height reading of a power line and observe long-term trends in the time delay from signal emission to reception of an echo-signal. This allows for accurate measurement of various physical parameters of a power line, for example, the height of the power line above the ground.

BACKGROUND OF THE INVENTION

High-voltage transmission power lines strung from support towers form the backbone of the nation's electric power grid. Many of the power lines supported by nearly the multitude of towers run through isolated areas as they deliver electricity from generating plants to cities.

Continuous monitoring of electrical power lines, and in particular of high-voltage overhead lines, is essential in order to timely detect anomalous conditions, which could lead to an outage. In some cases, monitoring allows avoiding the outage, for example, by reducing the power transmitted by an overheated conductor while in other cases (e.g., cable in a wind storm) a localized outage is unavoidable, but timely intervention (e.g., by using monitoring information to redirect power flow) can avoid its propagation through the power grid leading to a generalized blackout.

Conventional approaches to monitor power lines can be time consuming, inaccurate, or require the actual presence of an engineer to physically conduct the measurement. For example, reflector-less laser technology is used for transmission and distribution applications such as sag profiling, measuring the heights of attachment points or a conductor from the ground, verifying vegetation clearances and determining the location for your guy wire. However, this technique is limited in that a person must stand at the location and measure the distance, height, and clearance values necessary to make critical decisions.

Other conventional methods use a time-domain reflectometer (TDR) to measure the change in impedance when a line is closer to the ground, but such a system does not provide very high accuracy as needed to predict power line failure.

Therefore, it would be advantageous to provide a compact, lightweight sensing device that measures at least one characteristic of an overhead power line that may be readily attached and removed from a power line.

SUMMARY OF THE INVENTION

The application generally encompasses systems and methods for monitoring a power line and in particular monitoring the height of a power line from the ground. The system and methods of the invention are much more accurate, use fewer resources, and do a better job of predicting power line failure than conventional methods. The system and methods of the invention also use far less power, and can be powered from scavenged power, from a power line application, or from a solar cell array, for example, from a cell phone.

In one embodiment, the invention encompasses a method for monitoring a power line comprising transmitting an identifiable signal from a transmitter device on power line, receiving the signal from the transmitter device on the power line by at least one sensor, processing the received signal using data from the at least one sensor to identify a parameter of the power line, and reporting the parameter of the power line to a network.

In certain embodiments, the frequency ranges from about 300 megahertz to about 2 gigahertz.

In other embodiments, the frequency is in the range of about 800 megahertz to about 900 megahertz.

In other embodiments, the frequency is in an acoustic range from 10 Hz to 1 MHz.

In other embodiments, the parameter is the distance of the power line at a given point along the power line from the ground.

In other embodiments, the transmitter device is a radio frequency transmitter.

In other embodiments, the transmitter device is an audio frequency transmitter.

In other embodiments, the transmitter device is a cell phone.

In other embodiments, the processing the received radio frequency signal is an arrival-time correlation process, distributed sensor/time of flight process, or an echolocation process.

In other embodiments, the processing of the received radio frequency signal further comprises synchronizing using GPS.

In other embodiments, the system uses location services provided by GPS.

In other embodiments, the system uses location services provided by GSM or CDMA or systems like GOOGLE® location services.

In other embodiments, the parameter of the power line is reported using wireless technology.

In other embodiments, the parameter of the power line is reported using wireline modulation technology along the conductor span of the power line.

In another embodiment, the invention encompasses a method for determining the height of a power line comprising receiving a radio frequency signal from a source placed along a power line, processing a received radio frequency signal using data received by a plurality of sensors, identifying an approximate localized point on the power line, the approximate localized point defining a physical height of the power line, and reporting the height of the power line over a network.

In another embodiment, the invention comprises a method for identifying a physical parameter of a power line comprising contacting at least one transmitting device with a power line, communicating information regarding the power line from at least one transmitting device to one or more receiving devices over a communication network; collecting with one or more receiving devices objective data from the transmitting device, processing the objective data from the at least one transmitting device to identify certain physical parameters of the power line; wherein the physical parameter comprises, for example, a distance from the transmitting device to the ground to record height of a power line.

In certain embodiments, the transmitter device comprises at least one of a GPS, a plurality of cell sites, a plurality of WiFi hotspots, and a plurality of other mobile devices.

In certain embodiments, the transmitting device is a radio-transmitting, device.

In certain embodiments, the transmitting device is an audio-transmitting device.

In certain embodiments, the radio-transmitting device is a cell phone.

In certain embodiments, the transmitting device transmits a radio frequency.

In certain embodiments, the radio frequency is in the range of about 300 megahertz to about 2 gigahertz.

In certain embodiments, the radio frequency is in the range of about 800 megahertz to about 900 megahertz.

In certain embodiments, the processing of the objective data received through a radio frequency signal is an arrival-time correlation process, distributed sensor/time of flight process, or an echolocation process.

In certain embodiments, the parameter of the power line is reported using wireless technology.

In another illustrative embodiment, a transmitter, for example a cell phone, is placed on a portion of each catenary on a power line, optionally in an orange ball to facilitate power line visibility. The cell phone emits a chirp or pulse and performs echolocation as is known in the art. By taking multiple readings, it is possible to average the height reading and observe long-term trends in the time delay from chirp to received echo signal. This measures the height of the cell phone above the ground very accurately. If more than one point on a catenary wire height needs to be measured, multiple cell phones encased in orange balls can be placed on the wire at different points along the catenary.

In still another illustrative embodiment, the cell phone measures the instantaneous height above the ground through echolocation. In certain embodiments, the cell phone stores and periodically forwards the measurements through the cellular data network to a central server or processing facility. In certain embodiments, the location processes the signals, produces an annotated map with all the measurements and even history of measurements, and signals any alarms as needed. In certain embodiments, the sag on a power line can be monitored as it is occurring. In certain embodiments, the alarms can be set as needed for any deviation from normal operations.

In certain illustrative embodiments, software in the cell phone can do the echolocation processing. It can also do timing, integrate GPS functionality, and manage data transmission to the central server.

In certain illustrative embodiments, in addition to measuring the echo-located height, a laser or optical or audio measurement could provide the height off the ground.

In certain illustrative embodiments, global positioning system (GPS) can synchronize all the sensors and time their actuation, GPS can also be averaged to get location down to centimeter resolution, for example, as is done for fault movement measurement in geology.

In another illustrative embodiment, OPS can synchronize two or more systems and the time of flight can be measured between the two cell phones through the wire, thus measuring the impedance variation along the wire. Further, a round trip can be measured by transmitting along the wire from cell phone A to cell phone B, waiting a precise number of nanoseconds, and return the signal back to the original phone. Then GPS clocks are not necessary, but simply a pair of precise timers, one to count out a precise time delay from receipt to transmission, and the other to measure the amount of time elapsed from transmission to reception.

In certain embodiments, other sensing can be integrated, including vibration, acceleration, noise, audio signals, local RF signals, light levels, images, videos and telemetering these to the central server. Commands can be received over the cellular or other wireless data network. Power and signal can be conveyed on the powerlines themselves as well.

DETAILED DESCRIPTION OF THE INVENTION

Figure 1:
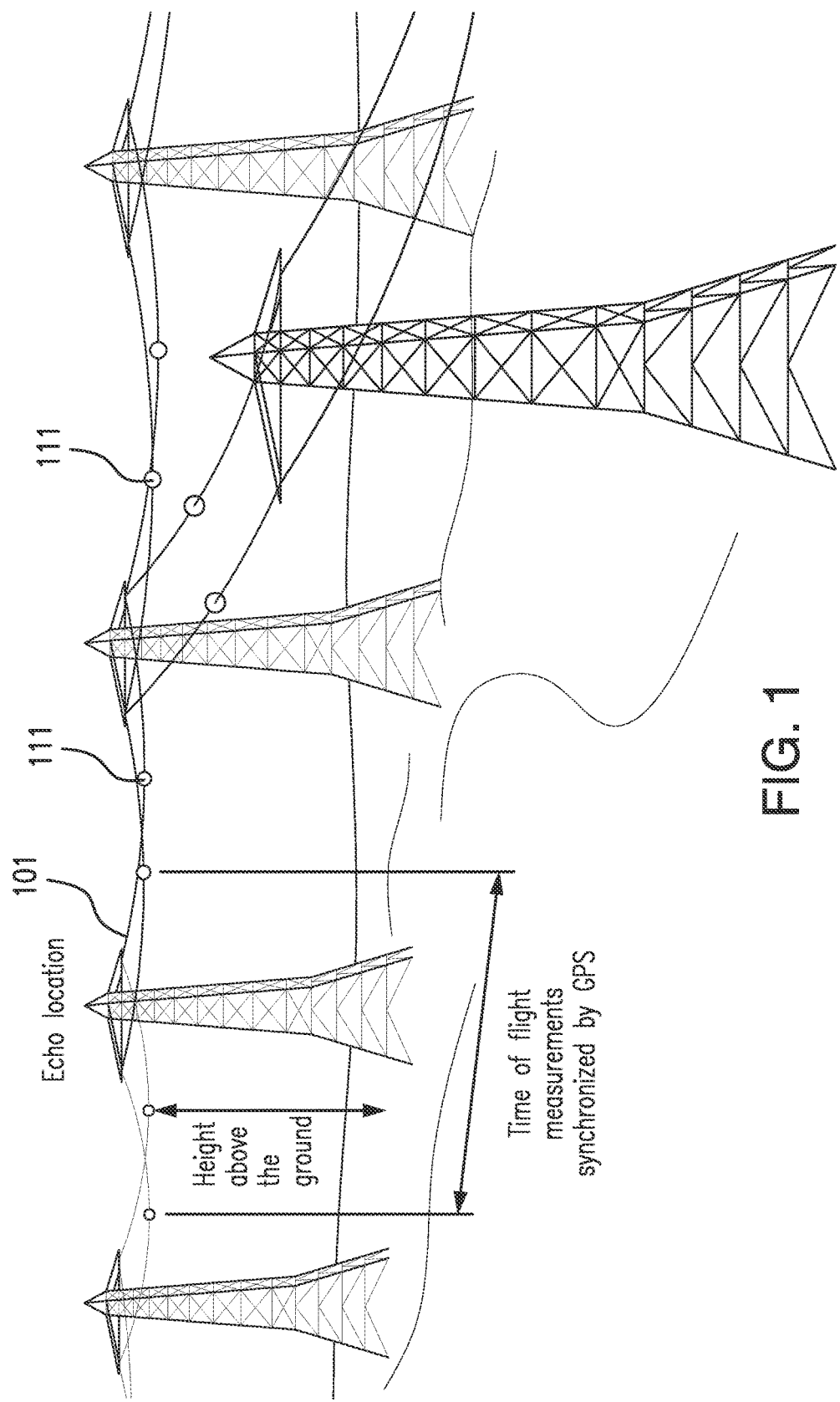
FIG. 1 illustrates an exemplary embodiment of the invention in which transmitters 111 are attached to power lines 101 wherein height and length are can be determined using echolocation and time of flight measurements synchronized by GPS.
Figure 2:
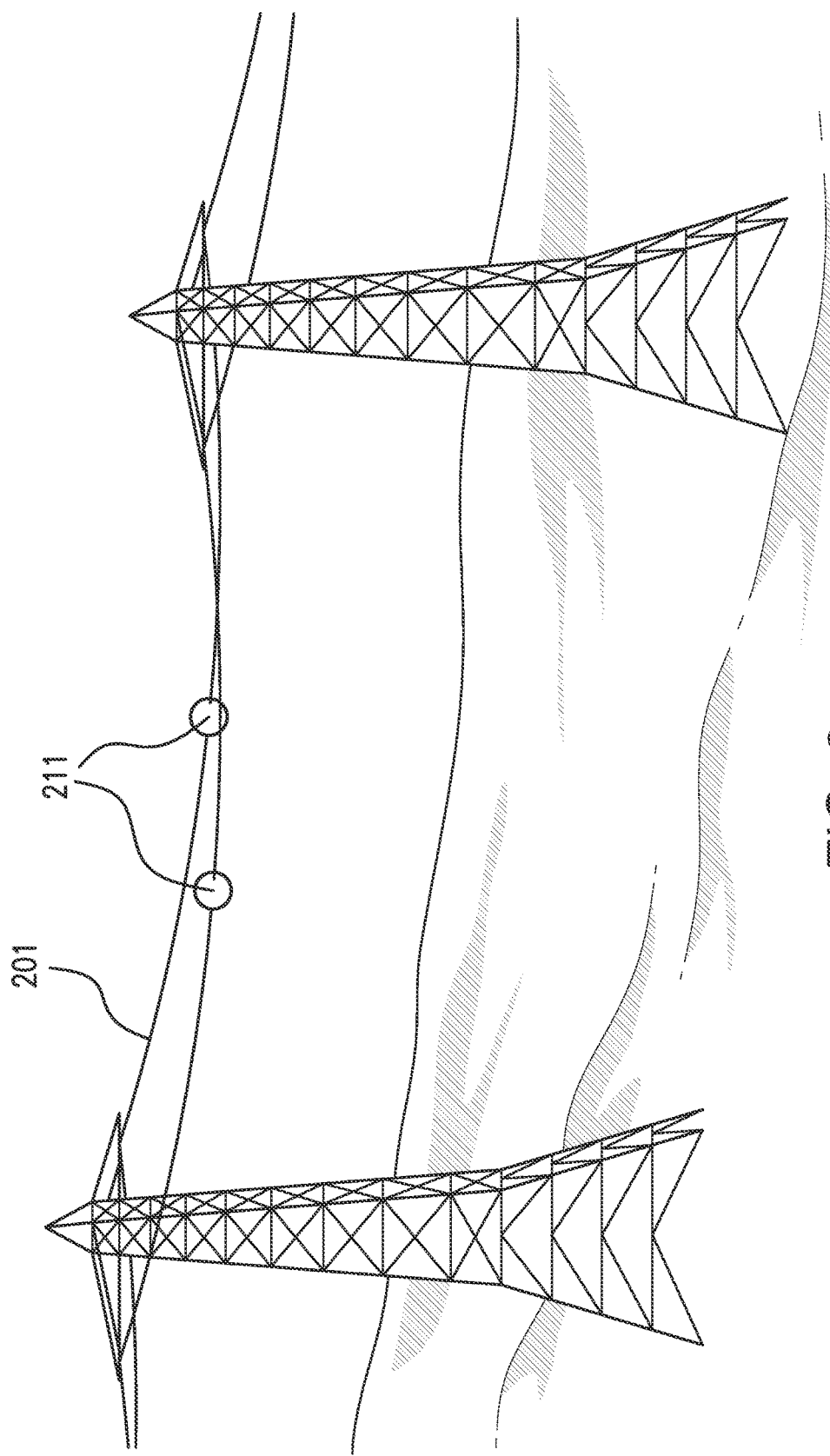
FIG. 2 illustrates a close up of a transmitter 211 (illustrated as a circle) on a power line 201.
Figure 3:
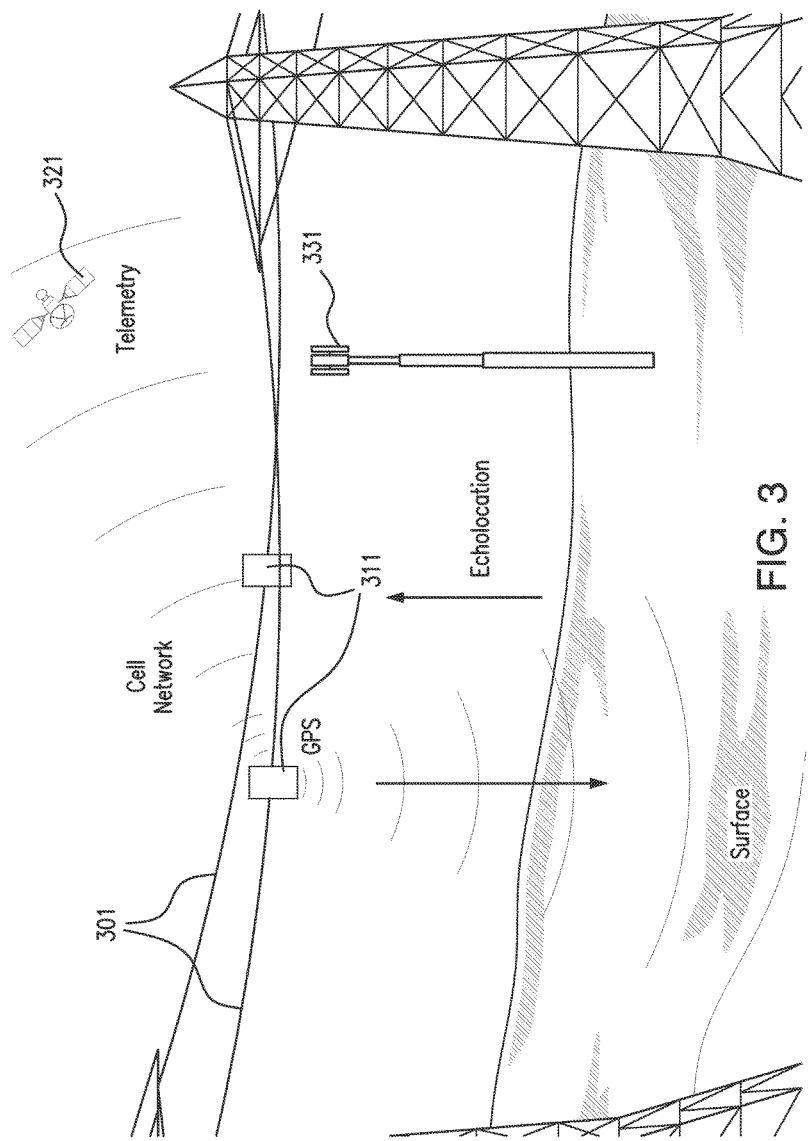
FIG. 3 illustrates another exemplary embodiment in which a transmitter 311 (illustrated as a cell phone) emits a signal through a cellular network to a receiver on a cell tower 331 and uses GPS and echolocation to determine the height of a power line 301.
Figure 4:
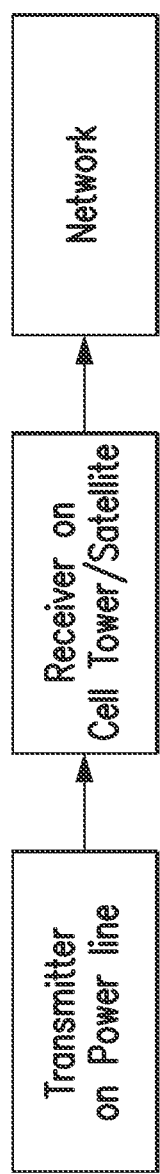
FIG. 4 illustrates an exemplary schematic of the method of the invention.

The invention generally encompasses a system and method for monitoring power lines. Such a monitoring device is provided with a housing whose design ensures a good electromagnetic shielding of the monitoring electronics. This allows operating even in the harsh environment constituted by the vicinity of a high voltage (e.g., tens to hundreds of kV) overhead power line. In certain embodiments, the transmitter device of the invention is capable of performing a complete monitoring of sag, vibrations, and movements of the power line. In certain exemplary embodiments, the transmitting device of the invention is protected against electromagnetic interferences, both quasi-static (low frequency electric and magnetic fields produced by normal operation of the line) and dynamical (transients due to commutations on the line, lightning, corona discharges) and despite being simple and lightweight, it allows determining in real time-dependent physical parameters (e.g., height or sag) of the whole span of a power line.

In certain embodiments, the transmitting device of the invention includes a wireless connection device. As used herein, the term "wireless connection device" may be any device capable of achieving wireless connection between two or more electronic devices. In certain embodiments, a wireless connection device may be capable of being wirelessly connected to one or more of the following electronic devices: wireless communication device, RFID devices, GPS devices, and the like, and/or combinations thereof, according to the particular application.

In certain embodiments, the transmitter device of the invention has dimensions and an overall weight, which avoids an excessive perturbation of the mechanical properties of the monitored power line, which could affect the significance of the measurements. In certain exemplary embodiments, the device is the size of a cellular phone. In other embodiments, the device is a cellular phone.

In certain embodiments, the location of the transmitter device can be calculated using an onboard positioning information device that is included in the transmitting device, or by getting network-assisted position information from the wireless network through a separate or same wireless connection, such as, for example, Time-Of-Arrival (TOA) algorithm techniques.

In certain embodiments, the system may include a global positioning system device (referred to as GPS device). In certain illustrative embodiments, the position information can also be obtained from a combination of a positioning information device, such as a GPS receiver, and a network-assisted approach, such as having the network send ephemeris data to the GPS receiver to help achieve faster time-to-fix techniques.

As used herein, the term "GPS device" may be any device capable of determining global position, according to the particular application, GPS device may be capable of communicating with a GPS satellite to transfer location information, such as coordinate location information, between a GPS device and one or more UPS satellites and/or a constellation of satellites and/or space vehicles and/or ground equipment. A GPS device may be coupled to wireless communication device to be capable of communicating location and position information of a power line, such as coordinate location information, to a network support center.

In a certain embodiment, a GPS satellite may be in communication with guidance support center, so that the system of the invention may be capable of communicating positional information of a power line, such as power line height and sag, to a network support center via GPS satellite.

In another illustrative embodiment, the system may be capable of communicating positional information, of a power line, to network support center via a radio frequency identification (RFID) device and data communications system. The location information, such as power line height information, may be used by network support center for analysis of the integrity of a power line. The GPS device and/or GPS satellite comprise one illustrative example of a location determining system for location system, and the scope of the claimed subject matter is not limited in this respect.

In certain embodiments, the location information of the transmitter device can be provided by configuring the transmitter device to allow position information to be received.

In certain embodiments, information regarding the location of the transmitter device is sent to the wireless network via a direct connection. The wireless network is connected to the wireless device a by means of a wireless connection, such as a radio frequency (RF), optical, or infrared connection, using various connection standards, such as CDMA, GSM, GPRS, WCDMA, or CDMA2000. In one illustrative embodiment, the information sent from the transmitter device contains the originating position and transmitter identification information, since the local position information is already known. In another embodiment, the information is sent directly to the wireless network through a dedicated connection.

In another embodiment, the transmitter device continually sends updated locational information to a receiving device, for example, on a cellular network tower. This continual signal providing real-time location information that allows a network operator to display and identify real-time positions of the transmitting device on a map of varying resolution and to determine changes in position, for example, a downed or sagging power line. In this embodiment, this positional information exchange is determined by a network operator.

In another embodiment, the position location information of the transmitter device is transferred to the wireless network by means of a wireless connection. The position information is calculated, prior to the transfer, by means of an onboard positioning information device that is connected to the transmitter device, or by receiving position information from the wireless network using a network assisted positioning approach. In certain embodiments, the receiving sensor device receives the position information for all the transmitting devices in real time.

In one embodiment, the information from the transmitter device is relayed to the receiver device through the wireless connection into the wireless network and through a dedicated server connection.

In another embodiment, the information from the transmitting device is relayed to the receiver device through a wireless connection into the wireless network or through a dedicated connection into the Internet, Intranet or Extranet.

In another embodiment, the receiving device requests positional information from the transmitting device attached to the power line. This request, after reaching the wireless network, is sent across the wireless connection to the transmitting device.

In certain embodiments, the transmitter device forwards its current positional information back to the receiving device. The transmitting devices, which are located at intervals along the power lines continually send their positional information to the plurality of receiving devices. In certain embodiments, an alarm is triggered when the position information has changed significantly as compared to the positioning error probability and as determined by the positioning technology or network configuration.

In certain embodiments, the network periodically updates each transmitting device with the other's positional information, thus providing real-time locational and position information. For example, if the power line changes by a certain height, for example, by greater than 3 cm, greater than 5 cm, greater than 10 cm, greater than 15 cm, greater than 20 cm, greater than 30 cm, greater than 50 cm, greater than 75 cm, greater than 100 cm, or greater than 500 cm this is an indication that power line may be experiencing sag or breakage and may require physical inspection or repair.

In certain other embodiments, when a transmitting device's position information is requested by a network administrator, the system responds with the appropriate position by transmitting information from a transmitting device to one or more receiving devices through the wireless network.

In certain embodiments, using information received from a transmitting device, it is possible to obtain the local position and any change in position for the purpose of monitoring a power line.

An exemplary system of the invention contains a processor, a plurality of transmitting devices equipped with a position determining system situated along one or more power lines, a memory or storage device, a plurality of receiving devices, a user interface, and a display. In certain embodiments, a user interface and display are combined and are located at a network hub, for example a power station. Once the positional information has been obtained, as previously described, the system can utilize this position information to provide certain information on the integrity of a power line.

In another embodiment, the system of the invention calculates all of the positional information and passes the information over to another device, such as a mobile computer, via a compatible connection interface in order to better display the information. As the transmitting device changes its position, position and/or data information is sent to the receiving device, via the cell network for real-time accurate data updates on the power line.

In another embodiment, a transmitting device of the invention contains, for example, a PDA, cellular telephone, or mobile computer, which has wireless connectivity. In this embodiment, the transmitting device can obtain position information by connecting through the wireless connection to the wireless network interface, which is then connected to the Internet, Intranet or Extranet, which is then connected to the network administrator.

In another embodiment, the transmitting device calculates instantaneously and continually a start position and a finish position of a power line. The transmitting device then sends, or pushes, this relational data to a receiving device. This insures that the data for power line position information is always up-to-date, reliable, and accurate.

In certain embodiments, the transmitter device includes hardware and further includes a transmitter and a receiver. The implementation of a transmitter enables additional positional location of the transmitter (and accordingly the power line) to be determined using ultrasonic or audio or infrasound echolocation. An embodiment of the transmitter that implements emitters and receivers would be configured with appropriate exterior features to enable proper function of the emitters and receivers.

In certain embodiments of the invention, there is included in the transmitter device an echolocation system. Also included in the transmitter device are transmitter circuits and a transmitter, receivers and corresponding receiver circuits.

In certain embodiments, the transmitter circuits comprise a variable frequency oscillator (VFO), a digital frequency synthesizer (DFS), and a digital signal processor (DSP). The variable frequency oscillator generates an acoustic pulse at a frequency controlled by the digital frequency synthesizer. The acoustic pulse is then formatted in the desired signal configurations by the digital signal processor.

The system of the invention in certain illustrative embodiments may also include a radio frequency identification device (referred to as RFID device hereinafter).

As used herein, the term "RFID device" may be any device capable of transferring radio frequency identification information. Examples of REID devices may include, but are not limited to active RFID devices, passive RFID devices, the like, and/or combinations thereof, according to the particular application. RFID device may be capable of communicating with a second RFID device located adjacent or remote from system to transfer RFID information between a first RFID device and a second RFID device. For example, an RFID device may include an RFID reader and/or an RFID tag, where RFID reader of RFID device may retrieve RFID information from an RFID tag of RFID device and/or where RFID tag of RFID device may deliver RFID information to RFID reader of RFID device. An exemplary RFID device may be coupled to wireless communication device to be capable of communicating location information, such as RFID information, to a network support center via wireless communication network.

In certain embodiments, a data communications system may be in communication with RFID device as well as the network support center, so that the system may be capable of communicating location and position information, such as RFID information, to guidance support center via RFID device and data communications system.

In certain embodiments, the system may be capable of communicating location information or position information of a power line to a network support center via RFID device and data communications system.

In certain embodiments, the power system may be scavenged from the power line conductors using passive or active electrical circuits and electrodes placed at advantageous locations in, on or near the powerline sensor. These circuits may comprise one or more electrodes, capacitors, diodes, switched capacitor circuits or photovoltaic arrays, among other electronic components.

As used herein, the term "data communications system" may be any system capable of data communications. Examples of data communications systems may include, but are not limited to online Network Operations Center (hereinafter NOC), and/or the like, according to the particular application. The location information, such as RFID information, may be used by network support center far analysis of location and position data to monitor the integrity of a power line. The RFID device comprises one illustrative example of a position determining system of the invention, and the scope of the claimed subject matter is not limited in this respect.

In certain embodiments, the system may include a camera. As used herein, the term "camera" may be any device capable of processing visual location information, including but not limited to picture information, video information, the like, and/or combinations thereof, according to the particular application. A camera may be coupled to wireless communication device to be capable of communicating location information, such as power line height, to a network support center. In certain embodiments, a system may be capable of communicating positional information, such as power line height information, to network support center via a RFID device and data communications system.

In certain embodiments, a database may be connected to network support center. A database may communicate with network support center to supply additional information to network support center. As used herein, the term "additional information" may include, but is not limited to data and/or programs including, but not limited to: public and/or private mapping information, address information, transmitter distances, transmitter height, the like, and/or combinations thereof.

EXAMPLES

A non-limiting exemplary power line monitoring system according to the invention comprises a plurality of transmitting devices located on spans of a power line and a plurality of receiving devices for collection and processing, in which the transmitting devices send information to a series of receiving devices using a cellular network.

If the transmitting devices are directly connected to a suitable telecommunication system such as a cellular network, the remote stations can be dispensed for measurement data being transmitted to the central station through a telecommunication system. Optionally, it is advantageous that transmitting devices comprise a pre-processor in order to compress raw measurement data before transmitting them. In the extreme compression case, data is reported only when it exceeds an acceptable range. Heartbeat communication signals ensure that the system is active and functioning properly.

Transmitted data are processed at the remote station in order to convert raw measurement data into directly exploitable monitoring information; it will be understood that transmitting devices can comprise a data processor in order to perform in situ pre-processing of said measurement data. The location of the transmitting device is typically calculated by the transmitting device by using an onboard positioning information device that is connected to the transmitting device, or by getting network-assisted position information from the wireless network through a separate or same wireless connection, such as, for example, Time-Of-Arrival (TOA) algorithm techniques. The position information can also be obtained from a combination of an onboard positioning information device, such as a GPS receiver, and a network-assisted approach, such as having the network send ephemeris data to the GPS receiver to help achieve faster time-to-fix techniques. The transmitting device can further use echolocation to determine certain other data, for example, distance between transmitting devices or height of the transmitting device from the ground below said transmitting device.

It should be noted that the present invention may be embodied in forms other than the preferred embodiments described above without departing from the spirit or essential characteristics thereof. The specification contained herein provides sufficient disclosure for one skilled in the art to implement the various embodiments of the present invention, including the preferred embodiment, which should be considered in all aspect as illustrative and not restrictive; all changes or alternatives that fall within the meaning and range or equivalency of the claim are intended to be embraced within.

What is claimed is:

1. A method for monitoring a power line comprising:
    a. transmitting an identifiable signal from a transmitter device defined on a power line;
    b. receiving the signal from the transmitter device defined on the power line by at least one receiving device;
    c. processing the received signal using data from the at least one receiving device to identify a parameter of the power line; and
    d. reporting the parameter of the power line to a network support center, wherein a database communicates with the network support center to supply information including mapping information of the transmitter device, address information of the transmitter device, transmitter distances and transmitter height;
    wherein the method utilizes an ultrasonic or infrasound echolocation process to determine the height above ground of the power line.

2. The method of claim 1, wherein the signal is a radio frequency signal in the range of about 300 megahertz to about 2 gigahertz.

3. The method of claim 1, wherein the signal is a radio frequency signal in the range of about 800 megahertz to about 900 megahertz.

4. The method of claim 1, wherein the parameter is the distance of the power line at a given point along the power line from the ground.

5. The method of claim 1, wherein the transmitter device is a radio frequency transmitter.

6. The method of claim 1, wherein the transmitter device is an audio frequency transmitter.

7. The method of claim 1, wherein the transmitter device is a cell phone.

8. The method as recited in claim 1, wherein the processing the received radio frequency signal is an arrival-time correlation process, distributed sensor/time of flight process, or an echolocation process.

9. The method as recited in claim 1, wherein the processing the received radio frequency signal further comprises synchronizing using a global positioning system (GPS).

10. The method of claim 1, wherein the parameter of the power line is reported using wireless technology.

11. A method for determining the height of a power line comprising:
    a. receiving a radio frequency signal from a source placed on a power line;
    b. processing the received radio frequency signal using a plurality of receiving devices;
    c. identifying an approximate localized point on the power line, the approximate localized point defining a physical height of the power line; and
    d. reporting the height of the power line over a network to a network support center, wherein a database communicates with the network support center to supply information including mapping information of a transmitter device, address information of a transmitter device, transmitter distances and transmitter height;
    wherein the method utilizes an ultrasonic or infrasound echolocation process to determine the height above ground of the power line.

12. A method for determining the height of a power line comprising:
    a. receiving a signal from a source placed on a power line;
    b. processing the received signal using a receiving device;
    c. identifying an approximate localized point on the power line, the approximate localized point including a physical height of the power line; and
    d. reporting the height of the power line over a network to a network support center, wherein a database communicates with the network support center to supply information including mapping information of a transmitter device, address information of a transmitter device, transmitter distances and transmitter height;
    wherein the method utilizes an ultrasonic or infrasound echolocation process to determine the height above ground of the power line.

13. A method for identifying a physical parameter of a power line comprising:
    a. contacting at least one transmitting device to the power line;
    b. communicating a signal from the at least one transmitting device to a plurality of receiving devices over a communication network;
    c. processing the signal using a processor to identify at least one physical parameter of the transmitting device on the power line;
    d. collecting data with regard to the physical parameter of the transmitting device,
    e. reporting the physical parameter to a network support center, wherein a database communicates with the network support center to supply information including mapping information of a transmitter device, address information of a transmitter device, transmitter distances and transmitter height;
    wherein the method utilizes an ultrasonic or infrasound echolocation process to determine the height above ground of the power line based on the data to determine a distance from the transmitting device to the ground to record height of a power line.

14. The method of claim 11, wherein the receiving of a radio frequency is achieved through at least one of a GPS, a plurality of cell sites, a plurality of WiFi hotspots, and a plurality of other mobile devices.

15. The method of claim 11, wherein the source is a transmitting device comprising a radio-transmitting device.

16. The method of claim 15, wherein the radio-transmitting device is a cell phone.

17. The method of claim 15, wherein the transmitting device transmits a radio frequency.

18. The method of claim 15, wherein the source transmits a radio frequency in the range of about 600 megahertz to about 2 gigahertz.

19. The method of claim 15, wherein the source transmits a radio frequency in the range of about 800 megahertz to about 900 megahertz.

20. The method as recited in claim 11, wherein the processing the received radio frequency signal is an arrival-time correlation process, distributed sensor/time of flight process, or an echolocation process.

21. The method of claim 1, wherein the parameter of the power line is reported using wireless technology.

\* \* \* \* \*